(12) United States Patent
Scarborough

(10) Patent No.: US 9,552,716 B1
(45) Date of Patent: Jan. 24, 2017

(54) SINKHOLE DETECTOR

(71) Applicant: Jerry Scarborough, Brooksville, FL (US)

(72) Inventor: Jerry Scarborough, Brooksville, FL (US)

( * ) Notice: Subject to any disclaimer, the term of this patent is extended or adjusted under 35 U.S.C. 154(b) by 0 days.

(21) Appl. No.: 14/977,795

(22) Filed: Dec. 22, 2015

(51) Int. Cl.
*G08B 21/00* (2006.01)
*G08B 21/18* (2006.01)
*G01V 9/00* (2006.01)

(52) U.S. Cl.
CPC .................. *G08B 21/18* (2013.01); *G01V 9/00* (2013.01)

(58) Field of Classification Search
CPC ..................................................... G08B 21/18
USPC ............ 340/690, 686.1; 200/61.45 R, 61.52
See application file for complete search history.

(56) References Cited

U.S. PATENT DOCUMENTS

| 5,248,959 | A | * | 9/1993 | Chern | ..................... | G01V 1/008 200/61.45 R |
|---|---|---|---|---|---|---|
| 5,596,523 | A | | 1/1997 | Endoh | | |
| 5,929,767 | A | | 7/1999 | Wallick | | |
| 6,114,967 | A | | 9/2000 | Yousif | | |
| 6,121,888 | A | | 9/2000 | Bognar | | |
| 6,342,842 | B2 | | 1/2002 | Chen | | |
| 6,459,379 | B1 | | 10/2002 | Ho | | |

* cited by examiner

*Primary Examiner* — Jeffery Hofsass
(74) *Attorney, Agent, or Firm* — Kyle A. Fletcher, Esq.

(57) ABSTRACT

The sinkhole detector detects the formation of sinkholes in the immediate vicinity of the sinkhole detector and generates an alarm when a sinkhole is detected. The sinkhole detector is partially buried in the ground such that if a sinkhole forms underneath the sinkhole detector a weight is released into the void created by the sinkhole. The release of the weight initiates an alarm signal that a sinkhole has appeared. The sinkhole detector comprises a weight, a cable, a housing, and a control circuit.

19 Claims, 6 Drawing Sheets

SINKHOLE DETECTOR

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of geophysical sensors and measurements, more specifically, a sensor configured for use in detecting sinkholes.

SUMMARY OF INVENTION

The sinkhole detector detects the formation of sinkholes in the immediate vicinity of the sinkhole detector and generates an alarm when a sinkhole is detected. The sinkhole detector is partially buried in the ground such that if a sinkhole forms underneath the sinkhole detector a weight is released into the void created by the sinkhole. The release of the weight initiates an alarm signal that a sinkhole has appeared.

These together with additional objects, features and advantages of the sinkhole detector will be readily apparent to those of ordinary skill in the art upon reading the following detailed description of the presently preferred, but nonetheless illustrative, embodiments when taken in conjunction with the accompanying drawings.

In this respect, before explaining the current embodiments of the sinkhole detector in detail, it is to be understood that the sinkhole detector is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the sinkhole detector.

It is therefore important that the claims be regarded as including such equivalent construction insofar as they do not depart from the spirit and scope of the sinkhole detector. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

Figure 1:
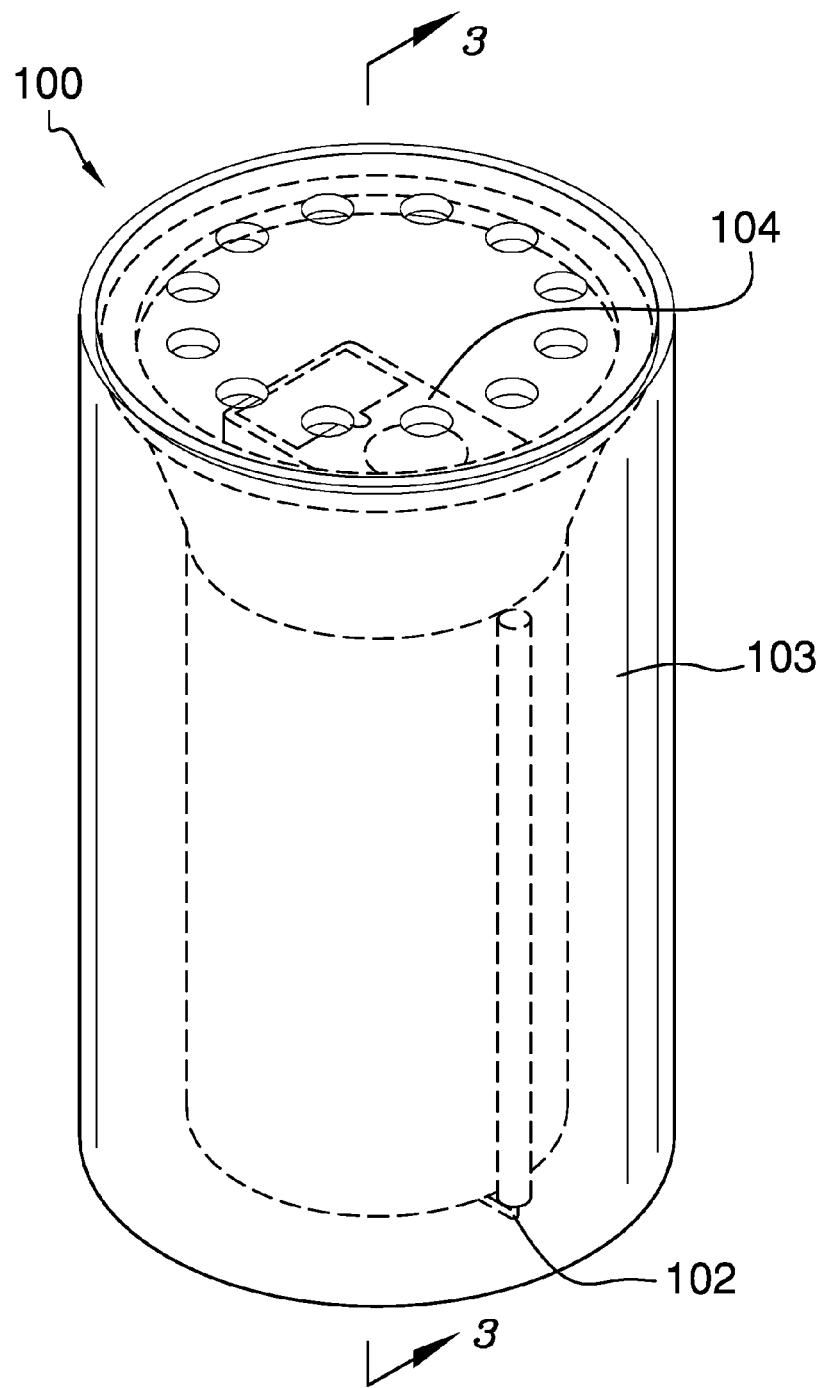
FIG. 1 is a perspective view of an embodiment of the disclosure.
Figure 2:
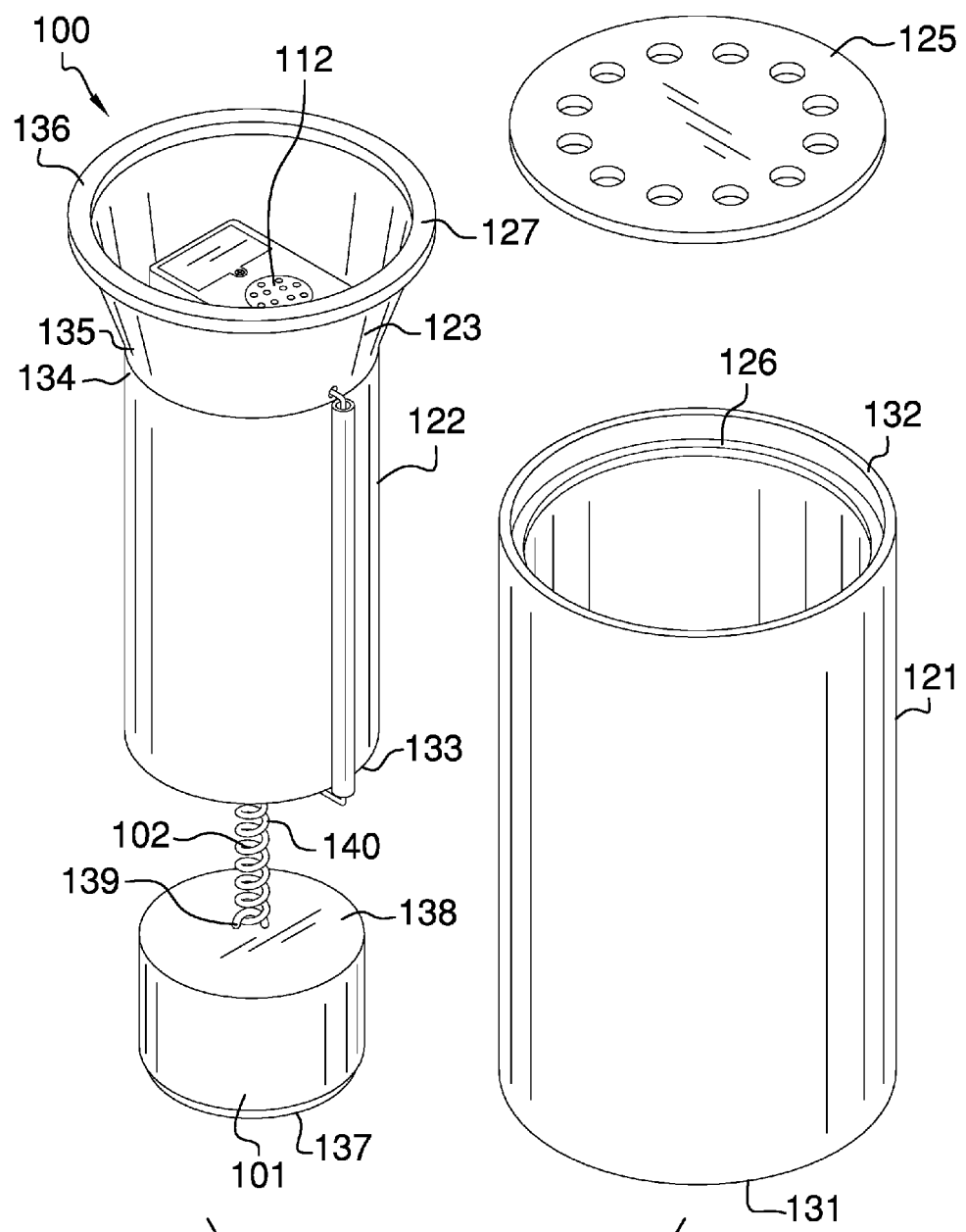
FIG. 2 is an exploded view of an embodiment of the disclosure.
Figure 3:
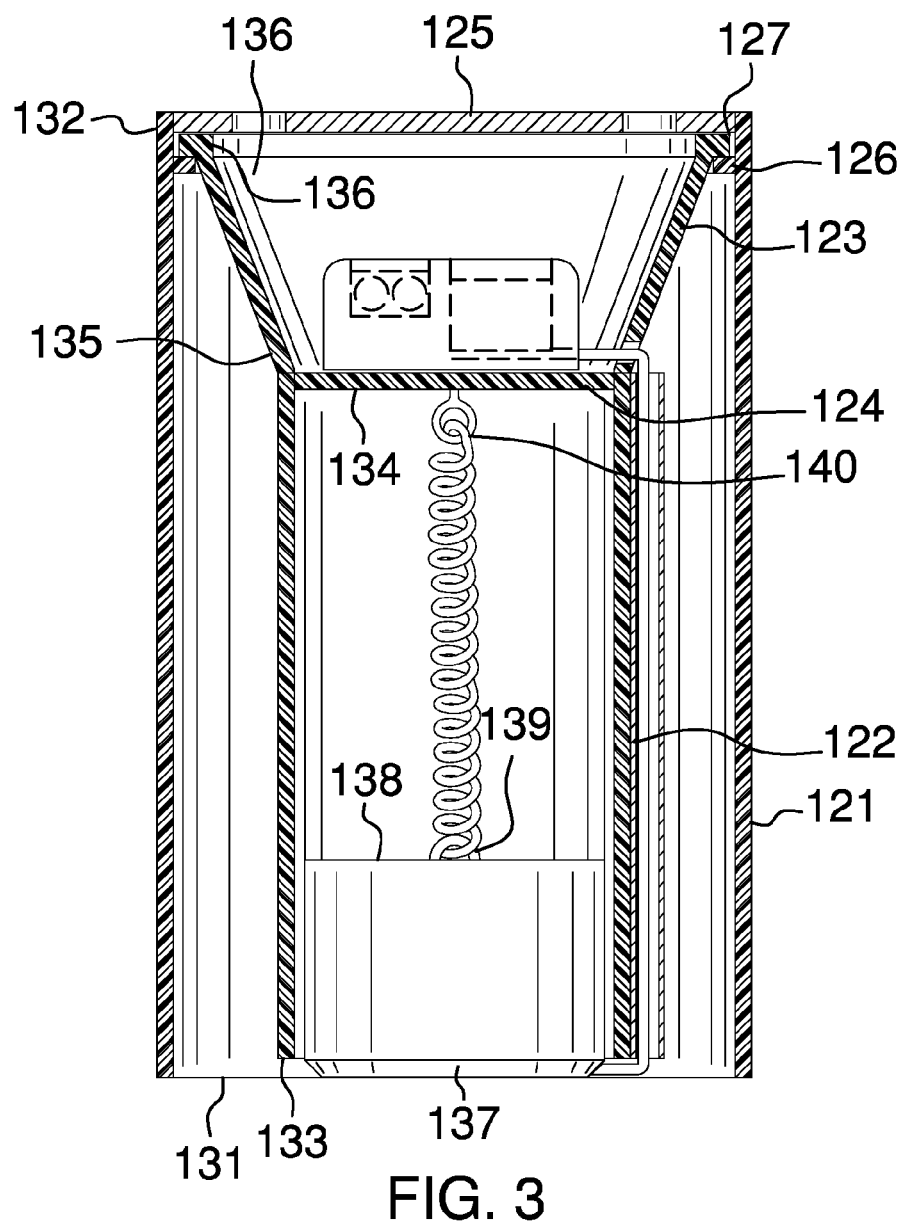
FIG. 3 is a cross-sectional view of an embodiment of the disclosure across line 3-3 in FIG. 1.
Figure 4:
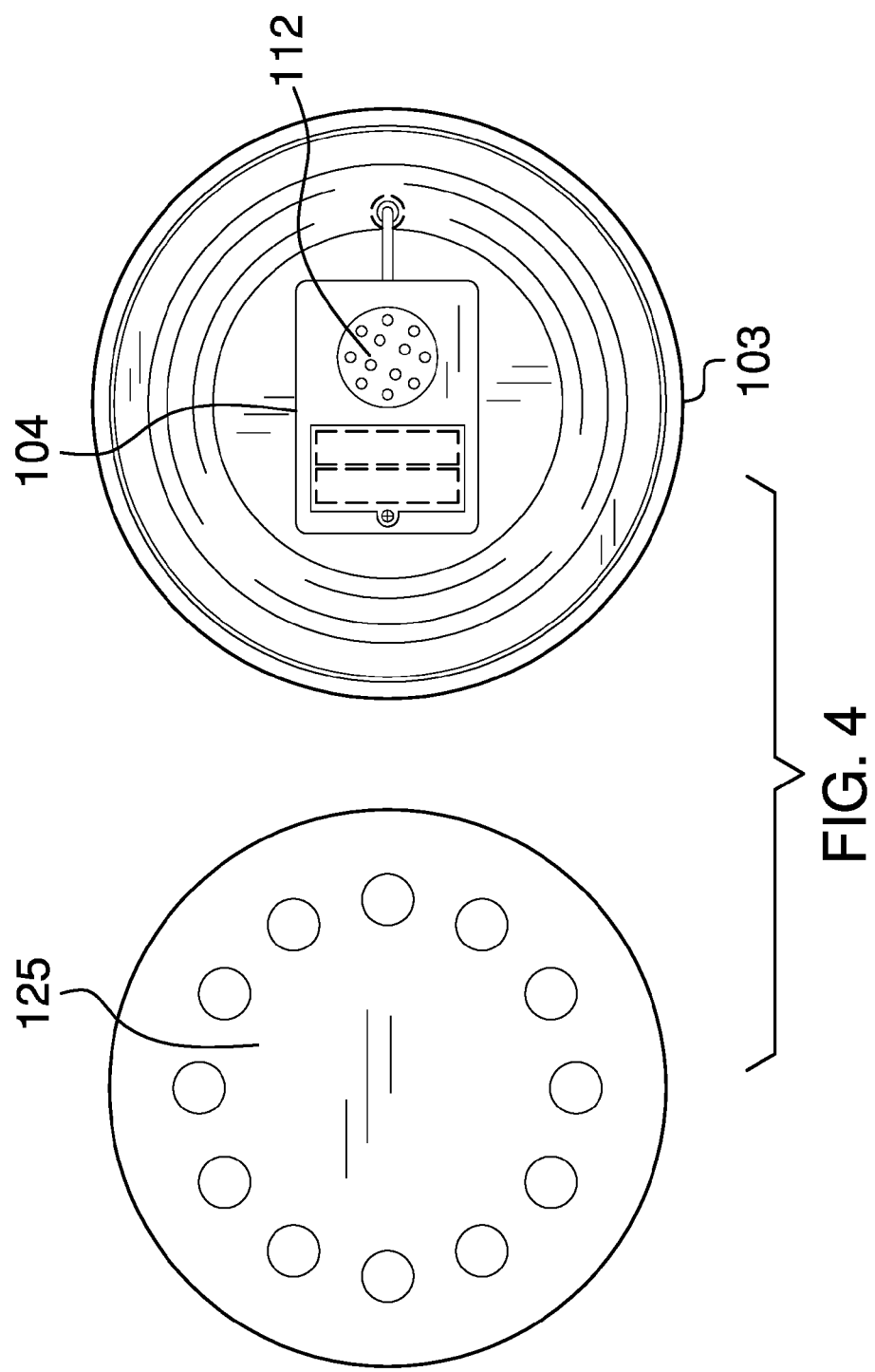
FIG. 4 is a top view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a first potential embodiment of the disclosure, which is illustrated in FIGS. 1 through 6. The sinkhole detector 100 (hereinafter invention) comprises a weight 101, a cable 102, a housing 103, and a control circuit 104. The invention 100 detects sinkholes through the use of the weight 101. When a sinkhole appears underneath the invention 100, the weight 101 slips out of the housing 103. This movement of the weight 101 activates the control circuit 104, which generates an audible alarm that a sinkhole is forming.

The housing 103 comprises an outer pipe 121, an inner pipe 122 a funnel 123, a funnel floor 124, and a lid 125. The outer pipe 121 is a commercially available pipe that is further defined with a first end 131 and a second end 132. A lip 126 is formed on the inner surface of the outer pipe 121 near the second end 132 of the outer pipe 121. The inner pipe 122 is a commercially available pipe that is further defined with a third end 133 and a fourth end 134. The outer diameter of the inner pipe 122 is less than the inner diameter of the outer pipe 121, which allows the inner pipe 122 to fit inside the outer pipe 121. The outer diameter of the inner pipe 122 is also lesser than the inner diameter of the lip 126 which allows the inner pipe 122 to fit within ring formed by the lip 126 within the outer pipe 121. As most clearly shown in FIGS. 2 and 3, the funnel 123 is a cone shaped device that is further defined with a fifth end 135 and a sixth end 136. The fifth end 135 is the apex of the funnel 123. The sixth end 136 is at the base end of the funnel 123. As shown most clearly in FIG. 3, the outer diameter of the sixth end 136 of the funnel 123 is lesser than the inner diameter of the outer pipe 121. The outer diameter of the fifth end 135 of the funnel 123 equals the outer diameter of the inner pipe 122. The fifth end 135 of the funnel 123 is attached to the fourth end 134 of the inner pipe 122.

A funnel floor 124 is located where the fifth end 135 of the funnel 123 is attached to the fourth end 134 of the inner pipe 122. The funnel floor 124 is a fixed horizontal surface to which the cable 102 is attached and on which the control circuit 104 rests. The cable 102 and the control circuit 104 are discussed elsewhere in this disclosure. To assemble the housing 103, the third end 133 of the inner pipe 122/funnel 123 combination is inserted into the second end 132 of the outer pipe 121 and the lip 126. A rim 127 formed by the circumference of the base (sixth end 136) of the funnel 123 rests upon the lip 126 to hold the inner pipe 122/funnel 123 combination in position within the outer pipe 121. The second end 132 of the outer pipe 121 and the base (sixth end 136) of the funnel 123 are covered with a lid 125 to shield the invention 100 from the environment. The lid 125 can be removed to provide access to the control circuit 104.

The weight 101 is a disk shaped metal block that is used to sense the sinkhole. Specifically, when a sinkhole appears, the ground 151 beneath the invention 100 will shift causing the weight 101 to separate from the housing 103. This separation between the housing 103 and the weight 101 causes the control circuit 104 to generate an alarm. The control circuit 104 is discussed elsewhere in this disclosure. The outer diameter of the weight 101 is lesser than the inner diameter of the outer pipe 121, which allows the weight 101 to be inserted into the first end 131 of the outer pipe 121. The weight 101 is further defined with a seventh end 137 and an eighth end 138. The seventh end 137 is that end of the weight 101 that is proximal to the ground 151 when the invention 100 is assembled. The eighth end 138 is the end of the weight 101 that is distal from the seventh end 137. The weight 101 is connected to the control circuit 104 using the cable 102. The cable 102 is further defined with a ninth end 139 and a tenth end 140. The ninth end 139 of the cable 102 is attached to the eighth end 138 of the weight 101. The tenth end 140 of the cable 102 is attached to the control circuit 104. A hole is formed in the funnel floor 124 to allow the tenth end 140 of the cable 102 to be attached to the control circuit 104.

Figure 6:
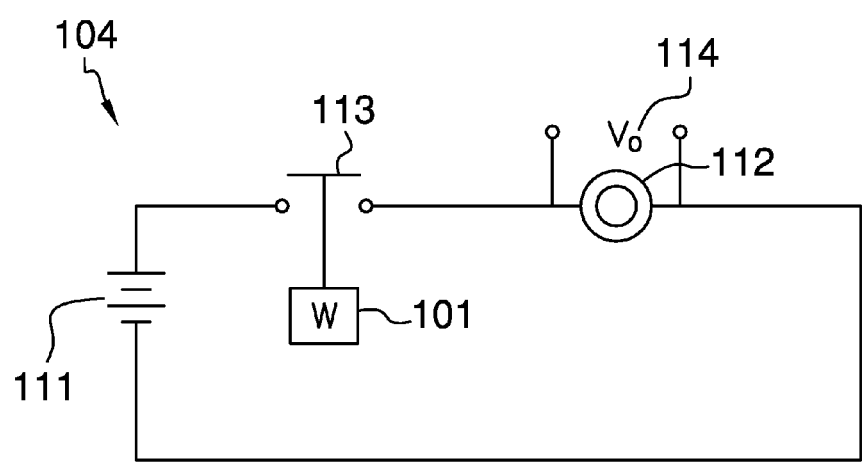
FIG. 6 is a schematic view of an embodiment of the disclosure.

The control circuit 104 monitors the relative position of the weight 101 and initiates an alarm when the weight 101 is separated from the housing 103. The control circuit 104 comprises a battery 111, a buzzer 112, a SPST switch 113 and an optional signal voltage output (Vo) 114. The battery 111 provides the electrical power used by the control circuit 104. The buzzer 112 is a two lead electrical component that is used to generate a sound when a voltage is applied across the two leads. The SPST switch 113 is a normally open momentary single pole single throw switch. As shown in FIG. 6, the control circuit 104 is assembled by connecting the battery 111, the buzzer 112, and the SPST switch 113 in series. Also shown is FIG. 6, is an optional signal voltage output (Vo) 114 connection that can be used to connect to and activate an externally provided alarm system. The control circuit 104 works as follows: the SPST switch 113 is attached to the tenth end 140 of the cable 102. When the weight 101 is separated from the housing 103, a tension is applied to the cable 102. The tension applied to the cable 102 causes the tenth end 140 of the cable 102 to close the SPST switch 113 thereby completing the control circuit 104 and generating the alarm.

Figure 5:
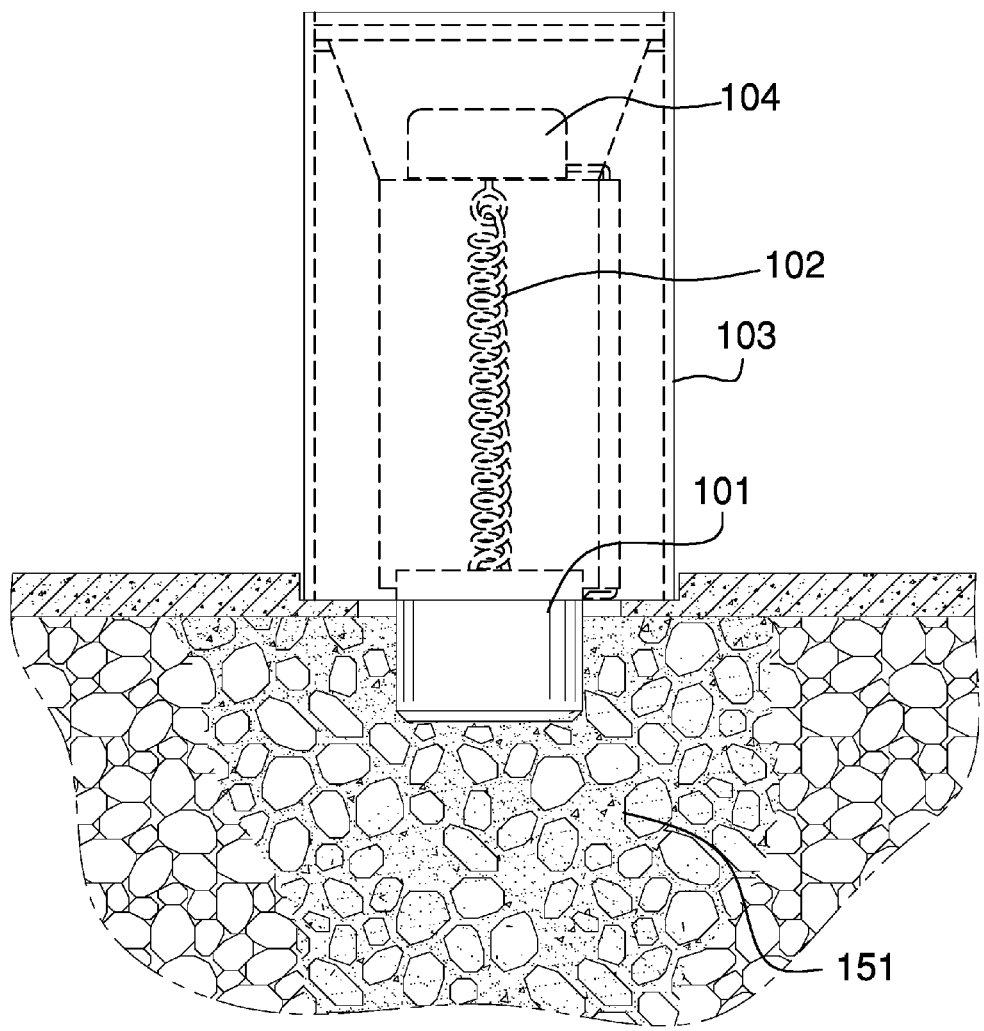
FIG. 5 is an in use view of an embodiment of the disclosure.

As shown in FIG. 5, to use the invention 100, a hole is dug into the ground 151 that is sized to receive the weight 101. If a sinkhole appears underneath the invention 100, the weight 101 will fall into the sinkhole thereby separating itself from the housing 103 of the invention 100. This separation places tension on the cable 102, which closes the SPST switch 113. Closing the SPST switch 113 completes the control circuit 104, which causes the buzzer 112 to generate an audible tone and, if supplied, generates the optional signal voltage output (Vo) 114 that can be used to activate external alarms.

In the first potential embodiment of the disclosure, the outer pipe 121, the inner pipe 122, the funnel, 123, the funnel floor 124 and the lid 125 are molded from plastic. The outer pipe 121 and the rim 127 are molded as a single unit. The inner pipe 122, the funnel 123 and the funnel floor 124 are molded as a single unit. The lid 125 is molded as a single unit. Suitable plastics include, but are not limited to, polyvinylchloride. The battery 111, buzzer 112, and the SPST switch 113 are readily and commercially available. The weight 101 is made of aluminum. The cable 102 is a helical coil extension spring.

The following definitions were used in this disclosure:

Battery: As used in this disclosure, a battery is a container consisting of one or more cells, in which chemical energy is converted into electricity and used as a source of power.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; or, 4) the point, pivot, or axis around which something revolves.

Center Axis: As used in this disclosure, the center axis is the axis of a cylinder like structure. When the center axes of two cylinder like structures share the same line they are said to be aligned. When the center axes of two cylinder like structures do not share the same line they are said to be offset.

Centerline: As used in this disclosure, the centerline is the axis of the pipe cylinder. When two pipes are centered on the same line this means that the cylinders of both pipes share the same axis.

Disk: As used in this disclosure, a disk is a cylindrically shaped object that is flat is appearance.

Funnel: As used in this disclosure, a funnel is a hollow cone shaped object with openings at the apex and base of the cone.

Inner Diameter: As used in this disclosure, the term inner diameter is used in the same way that a plumber would refer to the inner diameter of a pipe.

Outer Diameter: As used in this disclosure, the term outer diameter is used in the same way that a plumber would refer to the outer diameter of a pipe.

Pipe: As used in this disclosure, a pipe is a hollow cylindrical device that is used for transporting liquids and gasses. The line that connects the center of the first base of the cylinder to the center of the second base of the cylinder is referred to as the axis of the cylinder or the centerline of the pipe. When two pipes share the same centerline they are said to be aligned.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A detector comprising:
a weight, a cable, a housing, and a control circuit;
wherein the detector is adapted for use in detecting the formation of sinkholes;
wherein the formation a sinkhole in the presence of the detector causes the weight to be released from the detector;
wherein the release of the weight from the detector activates the control circuit;
wherein the activation of the control circuit generates an audible alarm;
wherein the housing comprises an outer pipe, an inner pipe, a funnel, a funnel floor, and a lid.

2. The detector according to claim 1 wherein
the outer pipe is further defined with a first end and a second end;
wherein a lip is formed on the inner surface of the outer pipe.

3. The detector according to claim 2 wherein the inner pipe is further defined with a third end and a fourth end;
wherein the outer diameter of the inner pipe is less than the inner diameter of the outer pipe.

4. The detector according to claim 3 wherein the outer diameter of the inner pipe is lesser than the inner diameter of the lip.

5. The detector according to claim 4 wherein the funnel is a cone shaped device that is further defined with a fifth end and a sixth end.

6. The detector according to claim 5 wherein the outer diameter of the sixth end of the funnel is lesser than the inner diameter of the outer pipe.

7. The detector according to claim 6 wherein the outer diameter of the fifth end of the funnel equals the outer diameter of the inner pipe.

8. The detector according to claim 7 wherein the fifth end of the funnel is attached to the fourth end of the inner pipe.

9. The detector according to claim 8 wherein the funnel floor is a fixed horizontal surface to which the cable is attached and on which the control circuit rests.

10. The detector according to claim 9 wherein the funnel floor is located where the fifth end of the funnel is attached to the fourth end of the inner pipe.

11. The detector according to claim 10 wherein the third end of the inner pipe is inserted into the second end of the outer pipe.

12. The detector according to claim 11 wherein the rim formed by the circumference of the sixth end of the funnel rests upon the lip.

13. The detector according to claim 12 wherein the weight is a disk shaped metal block and is further defined with a seventh end and an eighth end.

14. The detector according to claim 13 wherein the outer diameter of the weight is lesser than the inner diameter of the outer pipe.

15. The detector according to claim 14 wherein the cable is further defined with a ninth end and a tenth end;
wherein the ninth end of the cable is attached to the eighth end of the weight;
wherein the tenth end of the cable is attached to the control circuit.

16. The detector according to claim 15 wherein the control circuit comprises a battery, a buzzer, and an SPST switch.

17. The detector according to claim 16 wherein the SPST switch is a normally open momentary single pole single throw switch.

18. The detector according to claim 17 wherein the control circuit is assembled by connecting the battery, the buzzer, and the SPST switch in series.

19. The detector according to claim 18 wherein the control circuit further comprises a signal voltage output that is adapted to connect to an externally provided alarm system.

* * * * *